(12) United States Patent
Misaka

(10) Patent No.: US 7,292,398 B1
(45) Date of Patent: Nov. 6, 2007

(54) OPTICAL SYSTEM AND OPTICAL APPARATUS INCLUDING OPTICAL SYSTEM

(75) Inventor: Makoto Misaka, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/552,542

(22) Filed: Oct. 25, 2006

(30) Foreign Application Priority Data

Dec. 15, 2005 (JP) ............................. 2005-361953

(51) Int. Cl.
G02B 9/34 (2006.01)
(52) U.S. Cl. .................. 359/781; 359/766; 359/771
(58) Field of Classification Search ............... 359/781, 359/766, 680–684, 764, 763, 771, 713–715
See application file for complete search history.

(56) References Cited

U.S. PATENT DOCUMENTS

| | | | |
|---|---|---|---|
| 4,913,535 A | 4/1990 | Robb | |
| 6,025,962 A * | 2/2000 | Suzuki | 359/766 |
| 6,404,561 B1 | 6/2002 | Isono et al. | |
| 6,639,721 B2 * | 10/2003 | Endo | 359/566 |
| 7,164,446 B2 * | 1/2007 | Konishi | 348/349 |

FOREIGN PATENT DOCUMENTS

JP 2002-062478 A 2/2002

\* cited by examiner

Primary Examiner—Tim Thompson
(74) Attorney, Agent, or Firm—Canon USA Inc IP Division

(57) ABSTRACT

At least one exemplary embodiment is directed to an optical system which includes at least one first refractive optical element, which includes a solid material satisfying the following conditional expression (1), and at least one second refractive optical element, which includes a solid material satisfying the following conditional expression (2):

$$-1.33 \times 10^{-3} \times \upsilon d + 6.7 \times 10^{-1} < \theta gF \quad (1)$$

$$-1.63 \times 10^{-3} \times \upsilon d + 6.2 \times 10^{-1} > \theta gF \quad (2)$$

where $\upsilon d$ and $\theta gF$ indicate the Abbe number and the partial dispersion ratio, respectively.

8 Claims, 11 Drawing Sheets

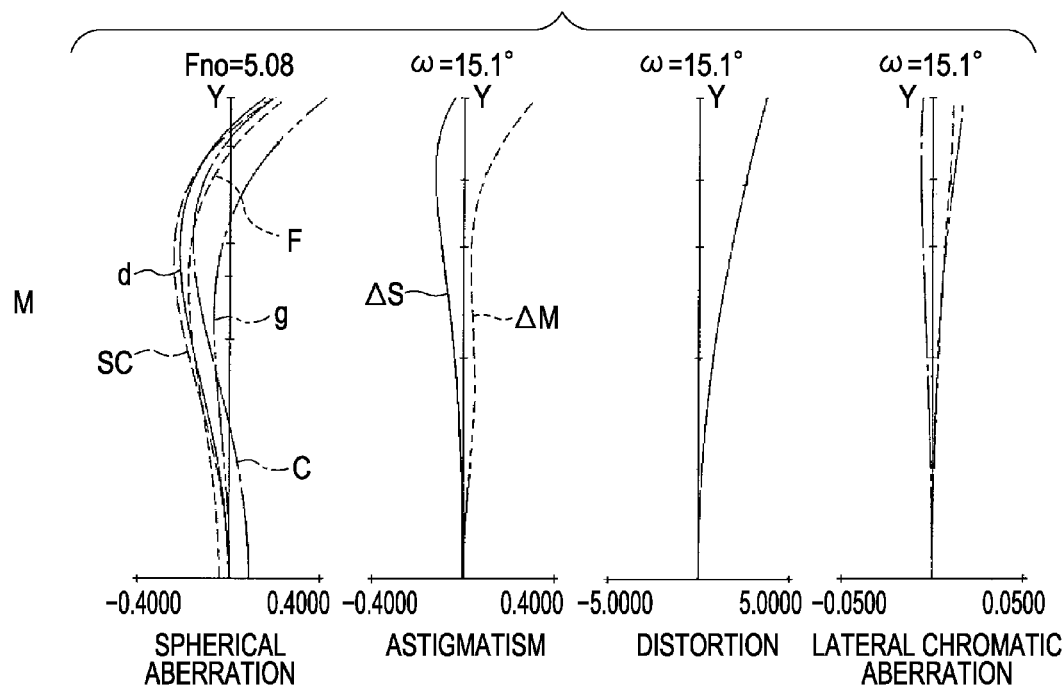
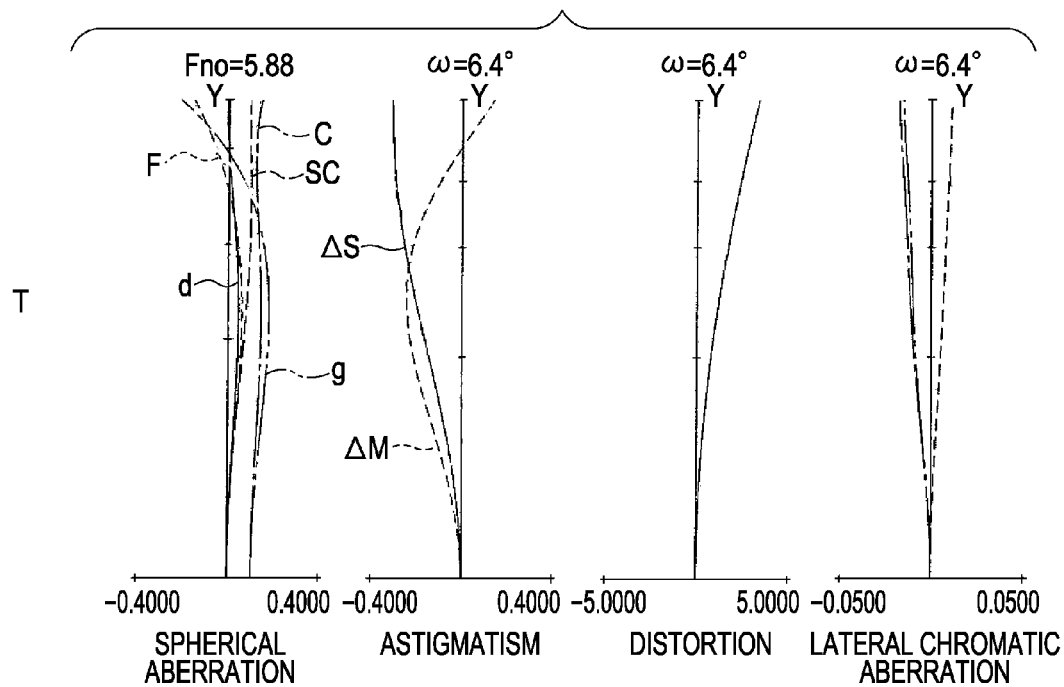

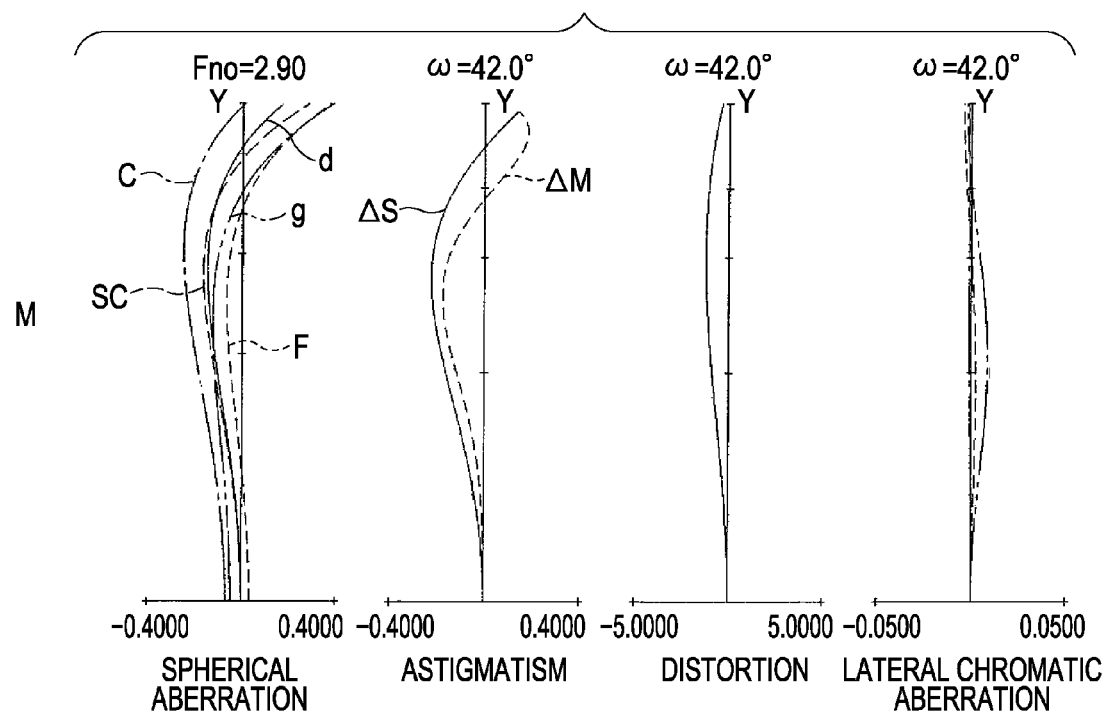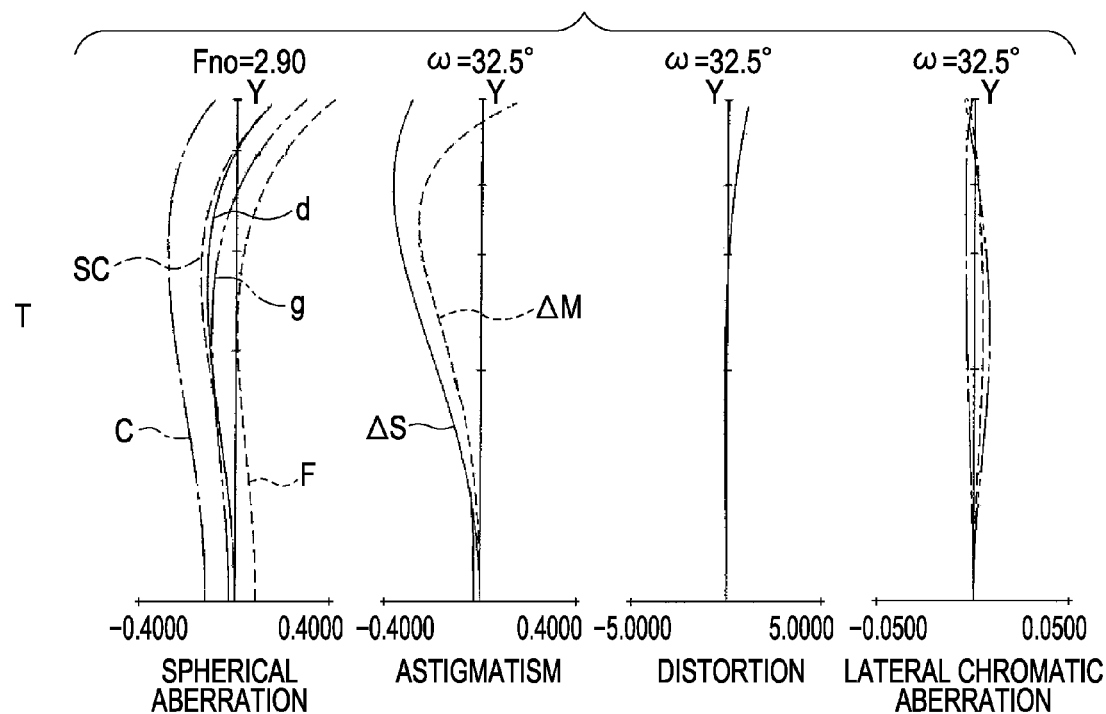

OPTICAL SYSTEM AND OPTICAL APPARATUS INCLUDING OPTICAL SYSTEM

BACKGROUND OF THE INVENTION

1. Field of the Invention

The present invention relates to optical systems and optical apparatuses including the optical systems.

2. Description of the Related Art

To date, optical systems having a short lens length (optical length; length from a first lens adjacent to an object to an image plane) have been demanded for optical apparatuses such as digital still cameras, video cameras, and projectors.

In general, compact optical systems having a short lens length tend to suffer from a greater amount of aberration, in particular, a greater amount of longitudinal and lateral chromatic aberration, resulting in lower optical performance.

In particular, the amount of chromatic aberration is increased in optical systems having a shortened lens length.

Well-known optical systems include lens systems of a so-called negative-lead type having a lens unit with a negative refractive power disposed in the anterior position and a lens unit with a positive refractive power disposed in the posterior position. Herein, the anterior position of the optical systems refers to a position adjacent to an object in the case of optical imaging systems such as cameras, or a position adjacent to a screen in the case of optical projection systems such as liquid-crystal projectors (magnification side). Also, the posterior position of the optical systems refers to a position adjacent to an image-taking side in the case of the optical imaging systems, or a position adjacent to an original picture in the case of the optical projection systems (demagnification side).

Since optical systems of the negative-lead type have a lens unit with a negative refractive power in the anterior position, negative distortion can easily occur. In order to correct the aberration, materials having high refractive indices may be used for negative lenses in lens units having a negative refractive power.

However, glass having a high refractive index generally has a high dispersion, and easily causes a greater amount of negative lateral chromatic aberration.

In order to reduce the generation of chromatic aberration, materials having anomalous partial dispersion may be used, or diffractive optical elements may be disposed in optical paths.

In general, a lens having a positive refractive power, which includes a low-dispersion optical material with an anomalous partial dispersion such as fluorite, and a lens having a negative refractive power, which includes a high-dispersion optical material, are used for reducing the occurrence of chromatic aberration. Optical systems including such lenses have been discussed in, for example, Japanese Patent Laid-Open No. 2002-62478 and U.S. Pat. No. 6,404,561.

Moreover, liquid materials having a relatively high dispersion and a relatively high anomalous partial dispersion, and achromatic optical systems including such liquid materials are also known (U.S. Pat. No. 4,913,535).

When a material having an anomalous partial dispersion is used for correcting the chromatic aberration of an optical system, the number of lenses in the optical system tends to be increased, thereby increasing the optical length. Moreover, it is very difficult to machine anomalous partial dispersion glass such as fluorite.

Furthermore, the specific gravity of the material is relatively large compared with that of other low-dispersion glasses without anomalous partial dispersion, and thus the entire lens system tends to be increased in weight. For example, the specific gravity of fluorite is 3.18, and that of a glass known under the trade name of FK01 is 3.63.

In contrast, the specific gravities of trade name materials FK5 and BK7 having low anomalous partial dispersion are 2.46 and 2.52, respectively.

Surfaces of anomalous partial dispersion glasses are easily damaged, and anomalous partial dispersion glasses having large diameters can be easily cracked with sudden temperature changes. Thus, application of materials having anomalous partial dispersion to optical systems is limited.

Liquid materials as discussed in U.S. Pat. No. 4,913,535 require structures for hermetically containing the liquid materials, resulting in difficulties in manufacturing optical systems including such materials. Also, it is difficult to apply the liquid materials to optical systems due to changes in refractive indices and dispersion characteristics according to temperature.

SUMMARY OF THE INVENTION

At least one exemplary embodiment is directed to an optical system that can be used in an optical apparatus (e.g., silver-salt film cameras, digital still cameras, video cameras, telescopes, binoculars, projectors, copying machines, and other optical apparatus as known by one of ordinary skill in the relevant arts).

At least one exemplary embodiment is directed to an optical system capable of appropriately correct chromatic aberration, capable of being easily manufactured, and having high optical performance.

An optical system according to an aspect of the present invention includes at least one first refractive optical element which includes a solid material satisfying the following conditional expression (1), and at least one second refractive optical element which includes a solid material satisfying the following conditional expression (2):

$$-1.33 \times 10^{-3} \times \upsilon d + 6.7 \times 10^{-1} < \theta gF \tag{1}$$

$$-1.63 \times 10^{-3} \times \upsilon d + 6.2 \times 10^{-1} > \theta gF \tag{2}$$

where $\upsilon d$ and $\theta gF$ indicate the Abbe number and the partial dispersion ratio, respectively. The Abbe number $\upsilon d$ and the partial dispersion ratio $\theta gF$ are defined by the following expressions:

$$\upsilon d = (Nd-1)/(NF-NC)$$

$$\theta gF = (Ng-NF)/(NF-NC)$$

where Ng, Nd, NF, and NC indicate refractive indices of the corresponding materials with respect to g line (wavelength of 435.8 nm), F line (wavelength of 486.1 nm), d line (wavelength of 587.6 nm), and C line (wavelength of 656.3 nm).

Further features of the present invention will become apparent from the following description of exemplary embodiments with reference to the attached drawings.

BRIEF DESCRIPTION OF THE DRAWINGS

FIGS. 4A, 4B, and 4C illustrate aberration in the second exemplary embodiment.

FIGS. 8A, 8B, and 8C illustrate aberration in the fourth exemplary embodiment.

DESCRIPTION OF THE EMBODIMENTS

Figure 1:
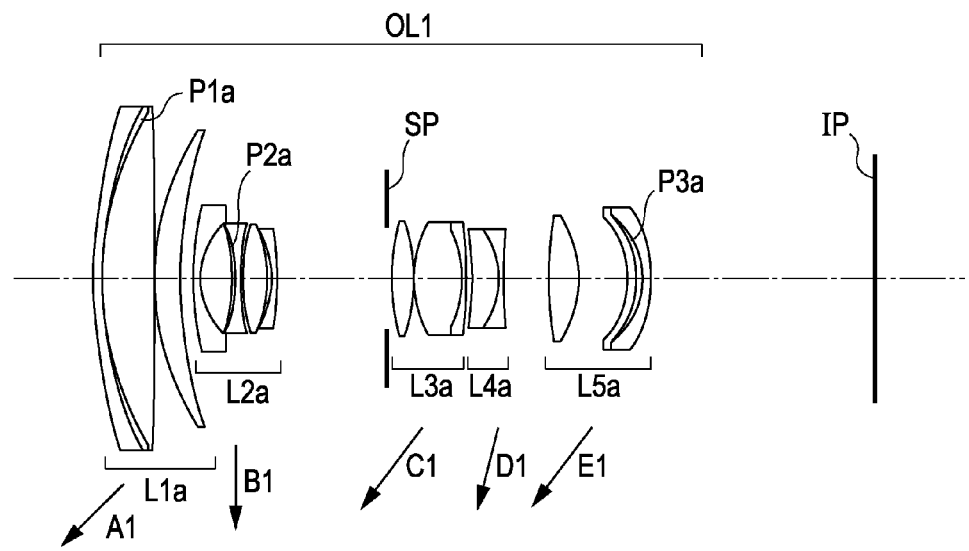
FIG. 1 is a cross-sectional view of an optical system according to a first exemplary embodiment of the present invention.
Figure 2A:
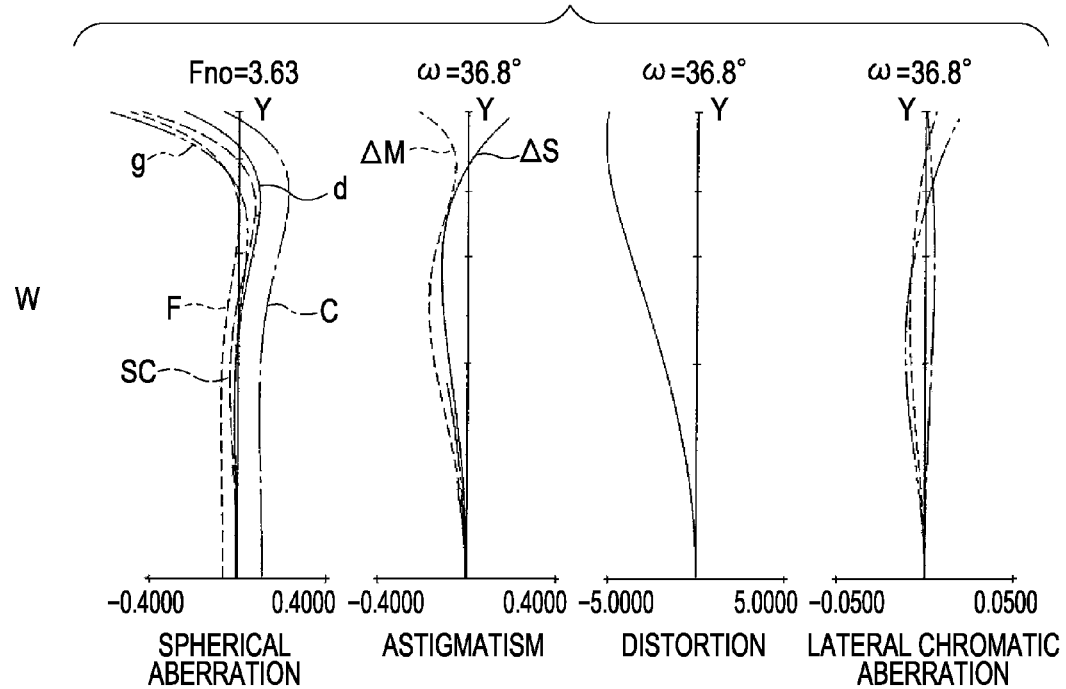
FIGS. 2A, 2B, and 2C illustrate aberration in the first exemplary embodiment.
Figure 2B:
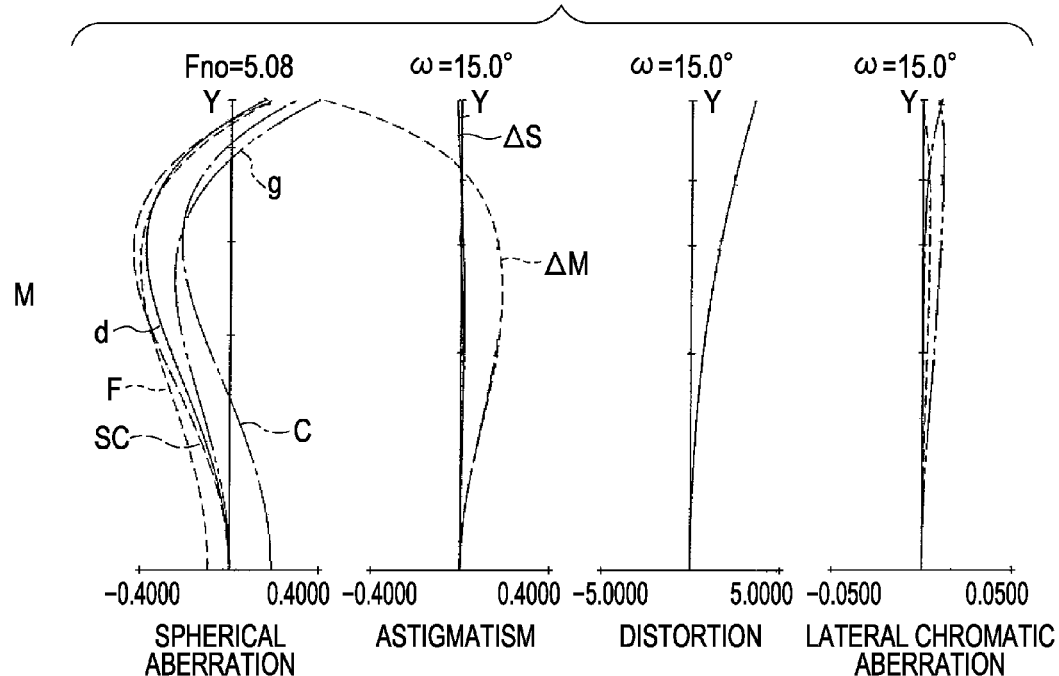
Figure 2C:
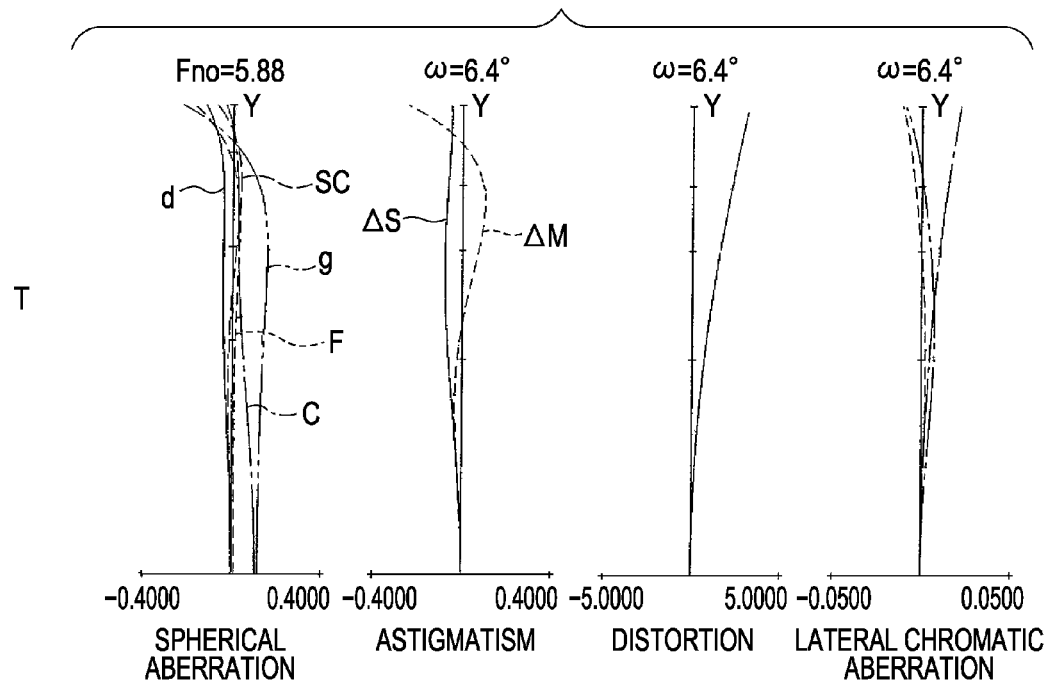

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

First Exemplary Embodiment

Figure 10:
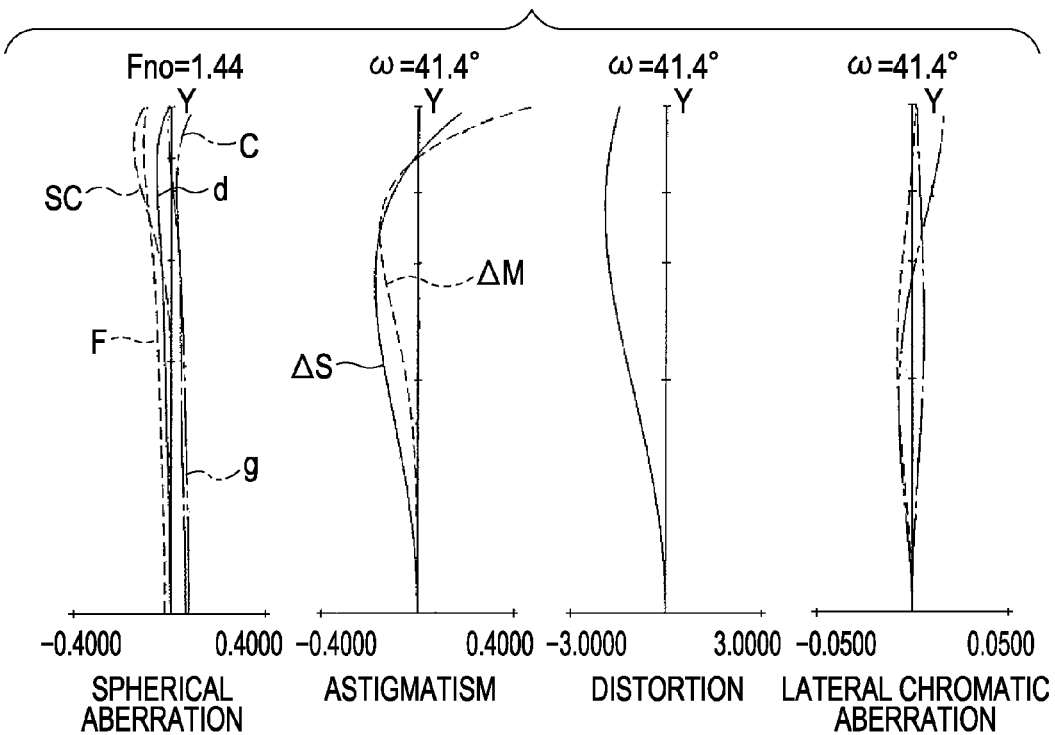
FIG. 10 illustrates aberration in the fifth exemplary embodiment.
Figure 12:
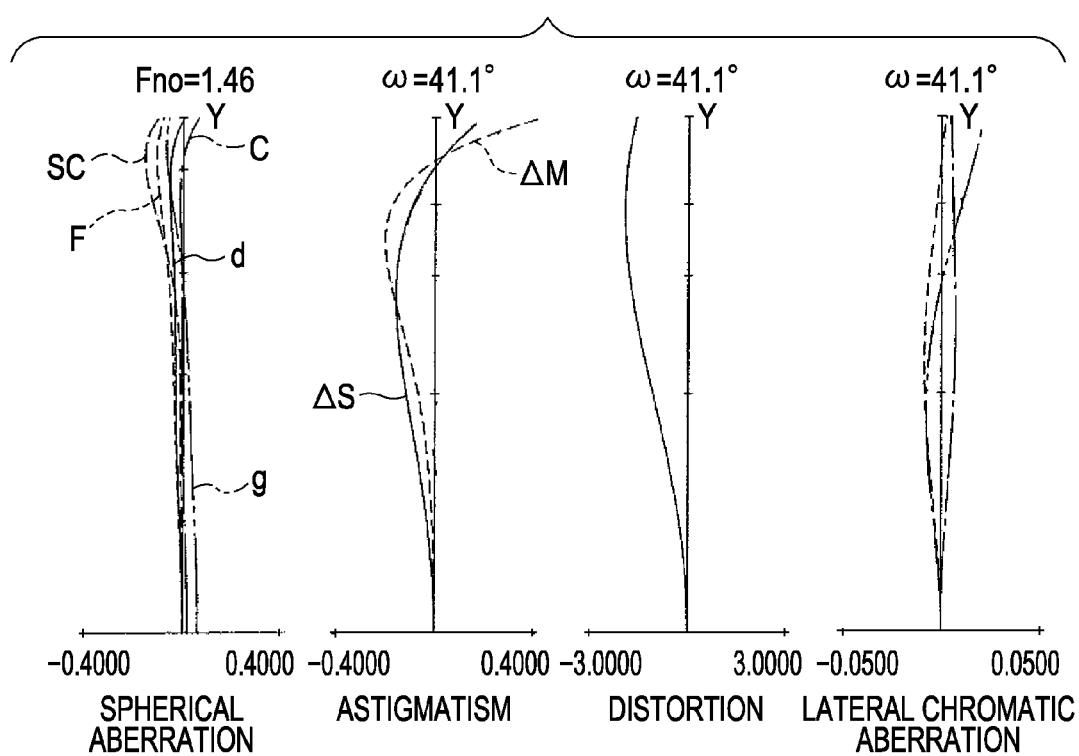
FIG. 12 illustrates aberration in the sixth exemplary embodiment.

FIGS. 1, 3, 5, and 7 are cross-sectional views of lenses at a wide-angle end. FIGS. 2A to 2C, 4A to 4C, 6A to 6C, and 8A to 8C illustrate aberration at the wide-angle end (A), at an intermediate position of a zoom range (B), and at a telephoto end (C). FIGS. 10 and 12 illustrate aberration when a focus of an optical system is adjusted to an object at infinity.

Optical systems (e.g., OL1-OL6) according to exemplary embodiments of the present invention can be used for imaging and/or optical apparatus (e.g., silver-salt film cameras, digital still cameras, video cameras, telescopes, binoculars, projectors, copying machines, and other optical apparatus as known by one of ordinary skill in the relevant arts). In the cross-sectional views of the lenses, the left side is adjacent to an object (the anterior position), and the right side is adjacent to an image-taking side (the posterior position).

When the optical systems according to the exemplary embodiments of the present invention are used as projector lenses for projectors, the left side is adjacent to a screen and the right side is adjacent to an original picture.

In the cross-sectional views of the lenses, reference characters OL, SP, FS, and FC indicate an optical system, an aperture stop, an F-number stop, and a flare-cutting stop, respectively.

Reference characters Lij indicate ith lens units where i indicates the ordinal position of the lens unit from the object side, and j identifies a particular exemplary embodiment's lens unit (e.g., L1a-f, L2a-f, L3a-f, L4a-f, L5a-c, and L6a).

An image plane IP corresponds to an imaging surface (e.g., the imaging surface) of a solid-state image-pickup device (photoelectric transducer) such as a charge-coupled device (CCD) sensor and a complementary metal-oxide semiconductor (CMOS) sensor when the optical systems are used for video cameras or digital still cameras; and corresponds to a film surface when the optical systems are used for silver-salt film cameras.

Arrows denote tracks of the lens units during zooming from the wide-angle end to the telephoto end (e.g., A1-A4; B1-B4; C1-C4; D1-D4; and E1-E3).

In the aberration drawings, reference characters d and g denote d line and g line, respectively; and reference characters ΔM and ΔS denote a meridional image surface and a sagittal image surface, respectively. The lateral chromatic aberration is illustrated with the g line. A reference character SC denotes the offence against the sine condition. Fno and ω indicate the F-number, and the half-angle of view, respectively, and the Y-axis in the spherical aberration's graph is entrance pupil radius, the Y-axis in the astigmatism's, distortion's and chromatic aberration of magnification's graphs is image height.

The optical systems according to the exemplary embodiments of the present invention include one or more first refractive optical elements which include a solid material satisfying the following conditional expression (1), and one or more second refractive optical elements which include a solid material satisfying the following conditional expression (2):

$$-1.33 \times 10^{-3} \times \upsilon d + 6.7 \times 10^{-1} < \theta gF \quad (1)$$

$$-1.63 \times 10^{-3} \times \upsilon d + 6.2 \times 10^{-1} > \theta gF \quad (2)$$

Herein, the term "solid materials" refers to materials in a solid state while the optical systems are used, and can be in any state before the optical systems are used, for example, during manufacturing. For example, materials that are in a liquid state during manufacturing and are hardened into solids correspond to the solid materials here.

Moreover, the term "refractive optical elements" herein refers to refractive lenses that affect incident light by the action of refraction, and do not include diffractive optical elements that affect incident light by the action of diffraction.

Features of dispersion characteristics of the optical materials used for the optical systems will now be described.

In general, during correction of lateral chromatic aberration in lens systems having a wide angle of view, the g line becomes overcorrected when the C line and the F line are appropriately corrected with respect to the d line serving as a reference wavelength, whereas the F line becomes undercorrected when the C line and the g line are appropriately corrected with respect to the d line serving as the reference wavelength.

In contrast, during correction of lateral chromatic aberration in telephoto lens systems, the g line becomes undercorrected when the C line and the F line are appropriately corrected with respect to the d line serving as the reference wavelength, whereas the F line becomes overcorrected when the C line and the g line are appropriately corrected with respect to the d line serving as the reference wavelength.

In order to appropriately correct the above types of aberration, a positive lens, which includes a material having a small partial dispersion ratio θgF, or a negative lens, which includes a material having a large partial dispersion ratio θgF, can be disposed adjacent to the object remote from the aperture stop in the lens systems having a wide angle of view, for example.

Alternatively, a positive lens, which includes a material having a large partial dispersion ratio θgF, or a negative lens, which includes a material having a small partial dispersion ratio θgF, can be disposed adjacent to the image-taking side remote from the aperture stop.

In the telephoto lens systems, a positive lens, which includes a material having a large partial dispersion ratio θgF, or a negative lens, which includes a material having a small partial dispersion ratio θgF, can be disposed adjacent to the object remote from the aperture stop.

Alternatively, a positive lens, which includes a material having a small partial dispersion ratio θgF, or a negative lens, which includes a material having a large partial dispersion ratio θgF, can be disposed adjacent to the image-taking side remote from the aperture stop.

These lenses are not used unconditionally. The Petzval sum of all the optical systems, effects on aberration such as spherical aberration and distortion, and fixing of the lens systems to lens barrels should be considered in order to find the best solution.

Accordingly, the optical systems according to the exemplary embodiments of the present invention include at least one first refractive optical element such as a lens and a film having a refractive power, which includes a solid material satisfying the above-described conditional expression (1), and at least a second refractive optical element satisfying the above-described conditional expression (2).

A non-limiting example of a solid material that satisfies the conditional expressions (1) and (2) include a resin containing inorganic particulates dispersed therein.

For example, solid materials that satisfy the conditional expression (1) include an ultraviolet (UV) curable resin (Nd=1.635, υd=22.7, θgF=0.69), and an N-polyvinylcarbazole (Nd=1.696, υd=17.7, θgF=0.69).

Other solid materials can be employed as long as the conditional expression (1) is satisfied.

Solid materials that satisfy the conditional expression (2) include a UV curable acrylic polymer containing indium-tin oxide (ITO) particulates in a mixture ratio of about 1 to 20%, the acrylic polymer being used as materials for replica aspheric lenses. When the mixture ratio is 20%, Nd, υd, and θgF of the material are 1.56987, 13.27, and 0.289, respectively.

Other sold materials can be employed as long as the conditional expression (2) is satisfied.

Signs of refractive power of the lenses or the films having a refractive power which includes the solid materials can be arbitrarily selected regardless of directions of correction of the lateral chromatic aberration as long as the conditional expressions (1) and (2) are satisfied. As a result, the lateral chromatic aberration can be appropriately corrected, and at the same time, corrections of, for example, the longitudinal aberration and the oblique aberration are facilitated.

Moreover, correction of the lateral chromatic aberration using a plurality of refractive optical elements facilitates balancing the lateral chromatic aberration against the longitudinal chromatic aberration.

A more useful range of the conditional expressions (1) and (2) can be set as below:

$$-1.33 \times 10^{-3} \times \upsilon d + 7.0 \times 10^{-1} < \theta gF \tag{1a}$$

$$-1.63 \times 10^{-3} \times \upsilon d + 5.0 \times 10^{-1} > \theta gF \tag{2a}$$

Resins used as the solid materials can improve efficiency in mass production when the resins are shaped by the action of photo polymerization or thermal polymerization using forming molds.

Next, features of the individual exemplary embodiments of the present invention will be described.

A first exemplary embodiment shown in FIG. 1 discloses a zoom lens including a first lens unit L1a having a positive refractive power (optical power; a reciprocal of focal length), a second lens unit L2a having a negative refractive power, a third lens unit L3a having a positive refractive power, a fourth lens unit L4a having a negative refractive power, and a fifth lens unit L5a having a positive refractive power, the lens units being aligned in this order from a position adjacent to the object to a position adjacent to the image-taking side.

Gaps between the lens units can be changed during zooming from the wide-angle side to the telephoto side. That is, the gaps between two adjacent lens units can be changed such that the gap between the first lens unit L1a and the second lens unit L2a is increased, the gap between the second lens unit L2a and the third lens unit L3a is reduced, the gap between the third lens unit L3a and the fourth lens unit L4a is increased, and the gap between the fourth lens unit L4a and the fifth lens unit L5a is reduced at the telephoto end compared with those at the wide-angle end.

Lenses P1a and P2a can include curable materials, for example a UV curable acrylic polymer containing ITO particulates in a mixture ratio of 15% (Nd=1.579, υd=16.5, θgF=0.362). That is, the lenses P1a and P2a correspond to the second refractive optical elements according to the first exemplary embodiment of the present invention.

A lens P3a can also include curable material, for example a UV curable resin (Nd=1.635, υd=22.7, θgF=0.69). That is, the lens P3a corresponds to the first refractive optical element according to the first exemplary embodiment of the present invention.

Figure 3:
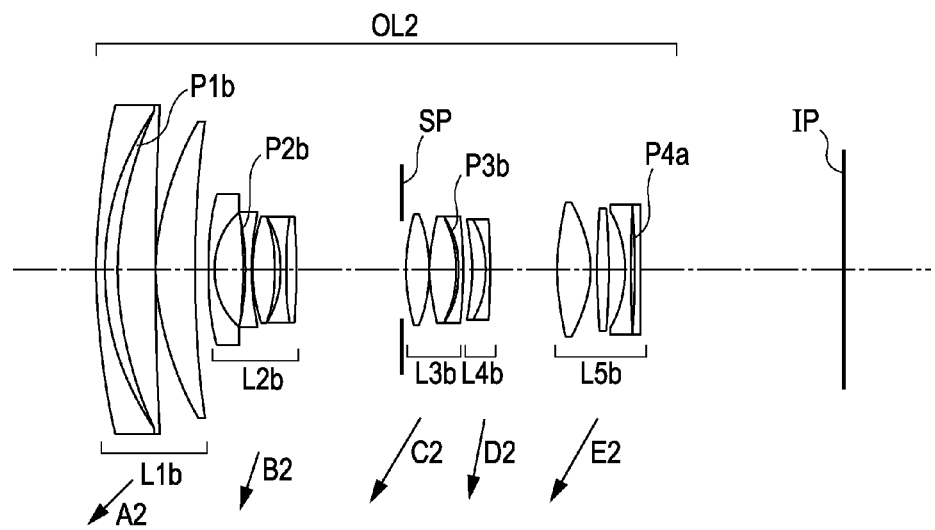
FIG. 3 is a cross-sectional view of an optical system according to a second exemplary embodiment of the present invention.
Figure 4A:
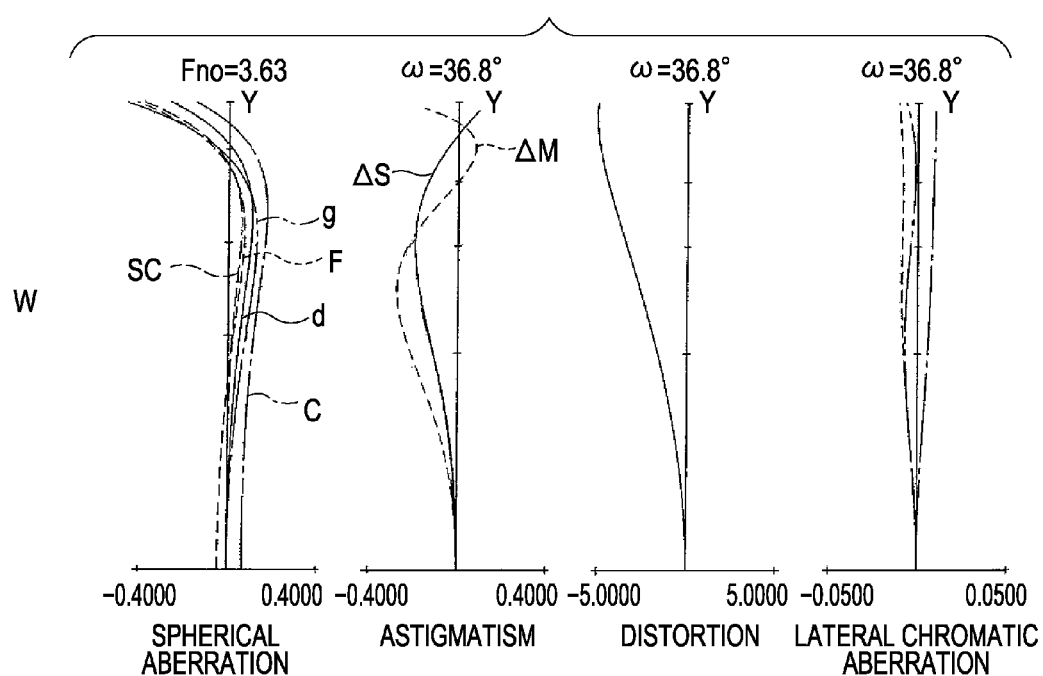

A second exemplary embodiment shown in FIG. 3 discloses a zoom lens including a first lens unit L1b having a positive refractive power, a second lens unit L2b having a negative refractive power, a third lens unit L3b having a positive refractive power, a fourth lens unit L4b having a negative refractive power, and a fifth lens unit L5b having a positive refractive power, the lens units being aligned in this order from a position adjacent to the object to a position adjacent to the image-taking side.

Gaps between the lens units can be changed during zooming from the wide-angle side to the telephoto side. That is, the gaps between two adjacent lens units can be changed such that the gap between the first lens unit L1b and the second lens unit L2b is increased, the gap between the second lens unit L2b and the third lens unit L3b is reduced, the gap between the third lens unit L3 and the fourth lens unit L4b is increased, and the gap between the fourth lens unit L4b and the fifth lens unit L5b is reduced at the telephoto end compared with those at the wide-angle end.

Lenses P1b, P3b, and P4a can include curable material, for example a UV curable resin (Nd=1.635, υd=22.7, θgF=0.69). That is, the lenses P1b, P3b, and P4b correspond to the first refractive optical elements according to the second exemplary embodiment of the present invention.

A lens P2b can also include curable material, for example a UV curable acrylic polymer containing ITO particulates in a mixture ratio of 15% (Nd=1.579, υd=16.5, θgF=0.362). That is, the lens P2b corresponds to the second refractive optical element according to the second exemplary embodiment of the present invention.

Figure 5:
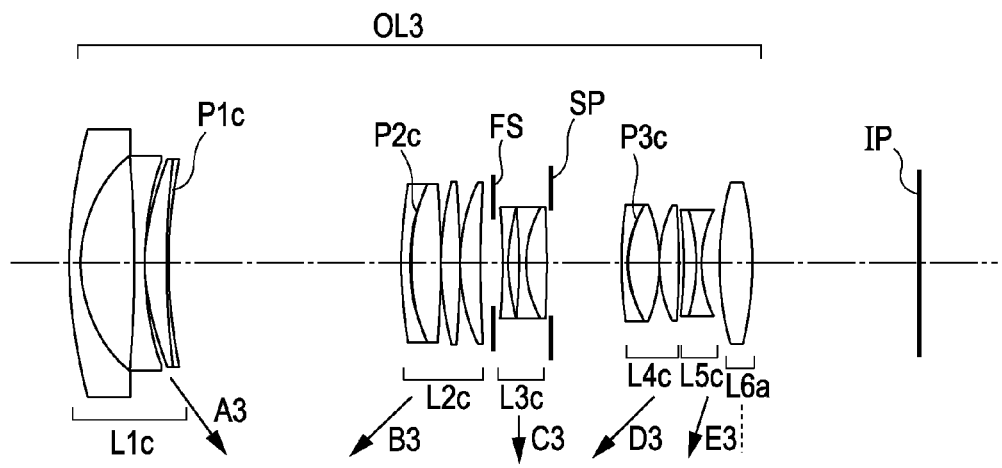
FIG. 5 is a cross-sectional view of an optical system according to a third exemplary embodiment of the present invention.
Figure 6A:
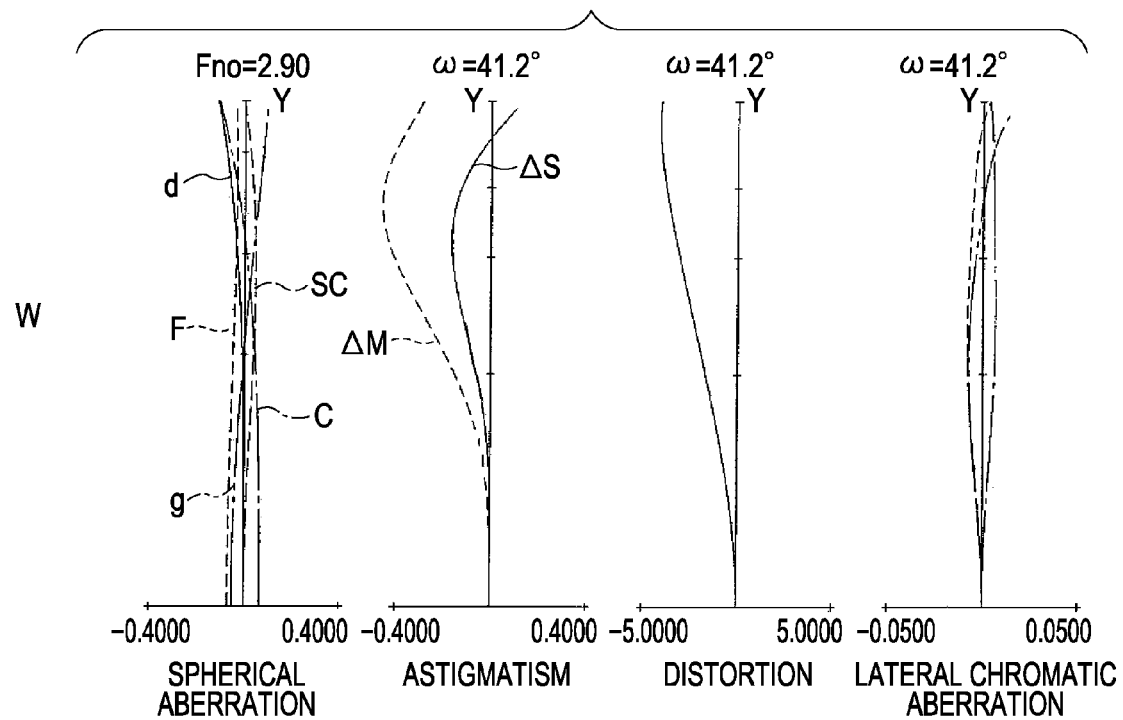
FIGS. 6A, 6B, and 6C illustrate aberration in the third exemplary embodiment.
Figure 6B:
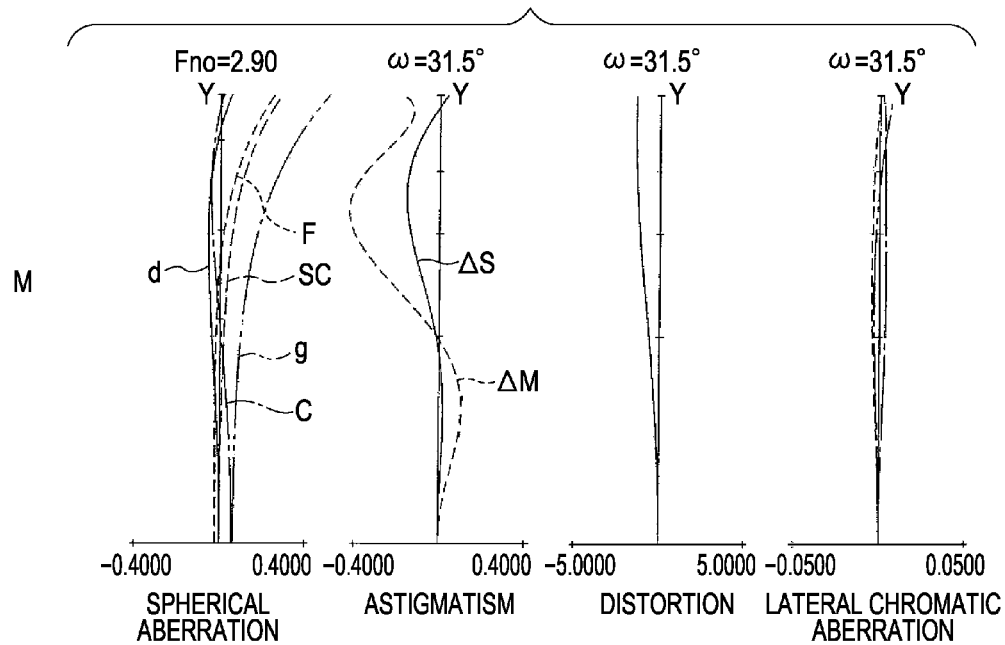
Figure 6C:
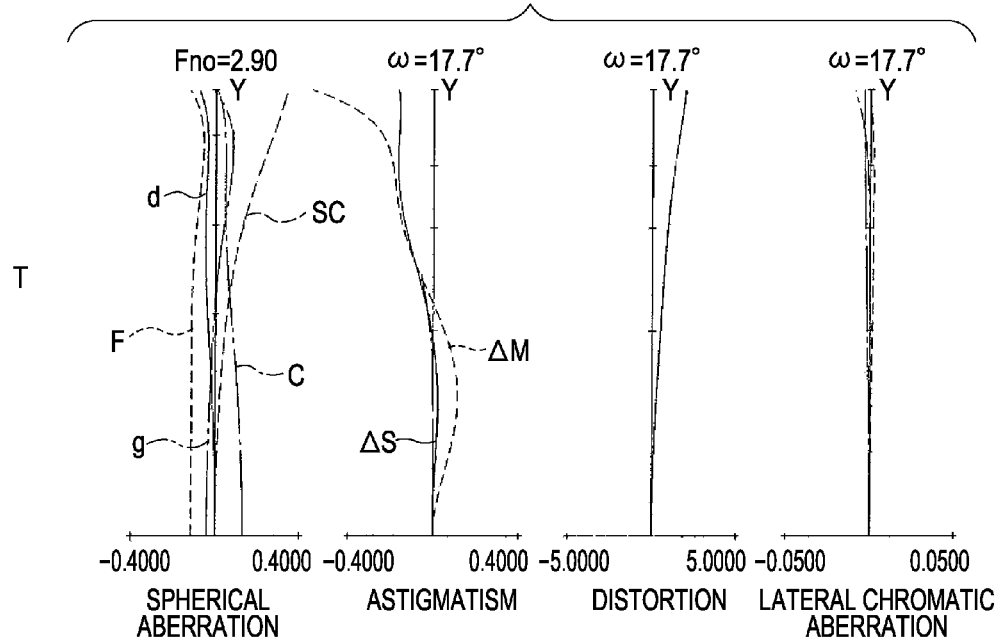

A third exemplary embodiment shown in FIG. 5 positive refractive power, a fifth lens unit L5c having a negative refractive power, and a sixth lens unit L6a having a negative refractive power, the lens units being aligned in this order from a position adjacent to the object to a position adjacent to the image-taking side.

Gaps between the lens units can be changed during zooming from the wide-angle side to the telephoto side. That is, the gaps between two adjacent lens units can be changed such that the gap between the first lens unit L1c and the second lens unit L2c is reduced, the gap between the second lens unit L2c and the third lens unit L3c is increased, the gap between the third lens unit L3c and the fourth lens unit L4c is reduced, the gap between the fourth lens unit L4c and the fifth lens unit L5c is increased, and the gap between the fifth lens unit L5c and the sixth lens unit L6a is increased at the telephoto end compared with those at the wide-angle end. The sixth lens unit L6a may not move for zooming.

During zooming, the F-number stop FS and the aperture stop SP move together with the third lens unit L3c.

Lenses P1c and P2c in the drawing can include curable materials, for example a UV curable resin (Nd=1.635, υd=22.7, θgF=0.69). That is, the lenses P1c and P2c correspond to the first refractive optical elements according to the third exemplary embodiment of the present invention.

A lens P3c can also include curable material, for example a UV curable acrylic polymer containing ITO particulates in a mixture ratio of 15% (Nd=1.579, υd=16.5, θgF=0.362). That is, the lens P3c corresponds to the second refractive optical element according to the third exemplary embodiment of the present invention.

Figure 7:
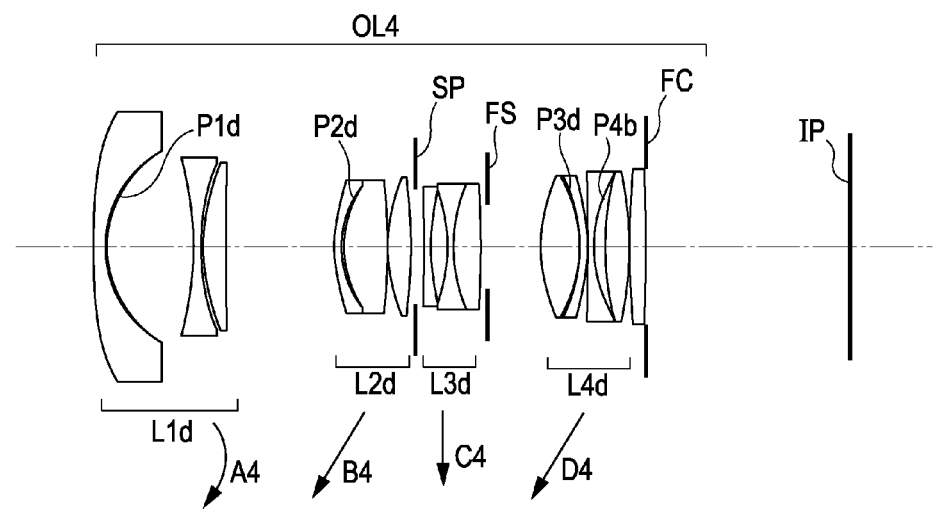
FIG. 7 is a cross-sectional view of an optical system according to a fourth exemplary embodiment of the present invention.
Figure 8A:
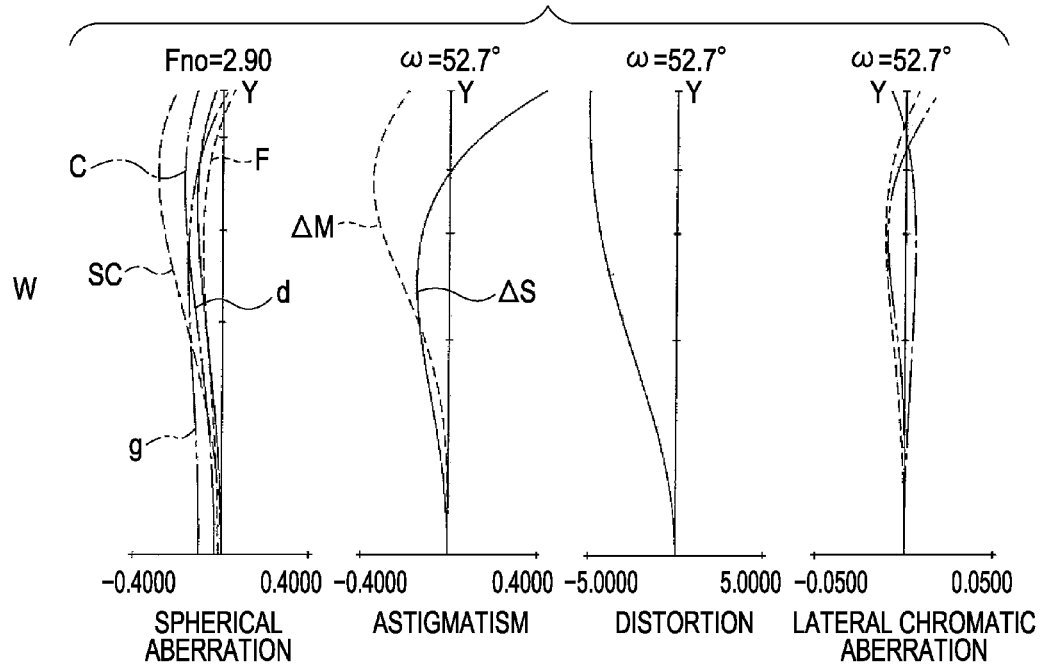

A fourth exemplary embodiment shown in FIG. 7 discloses a zoom lens including a first lens unit L1d having a negative refractive power, a second lens unit L2d having a positive refractive power, a third lens unit L3d having a negative refractive power, and a fourth lens unit L4d having a positive refractive power, the lens units being aligned in this order from a position adjacent to the object to a position adjacent to the image-taking side.

Gaps between the lens units can be changed during zooming from the wide-angle side to the telephoto side. That is, the gaps between two adjacent lens units can be changed such that the gap between the first lens unit L1d and the second lens unit L2d is reduced, the gap between the second lens unit L2d and the third lens unit L3d is increased, and the gap between the third lens unit L3d and the fourth lens unit L4d is reduced at the telephoto end compared with those at the wide-angle end.

During zooming, the F-number aperture stop FS and the aperture stop SP move together with the third lens unit L3d. The flare-cutting stop FC may not move during zooming.

Lenses P1d and P3d in the drawing can include curable materials, for example a UV curable acrylic polymer containing ITO particulates in a mixture ratio of 15% (Nd=1.579, υd=16.5, θgF=0.362). That is, the lenses P1d and P3d correspond to the second refractive optical elements according to the fourth exemplary embodiment of the present invention.

Lenses P2d and P4b can also include curable material, for example a UV curable resin (Nd=1.635, υd=22.7, θgF=0.69). That is, the lenses P2d and P4b correspond to the first refractive optical elements according to the fourth exemplary embodiment of the present invention.

Figure 9:
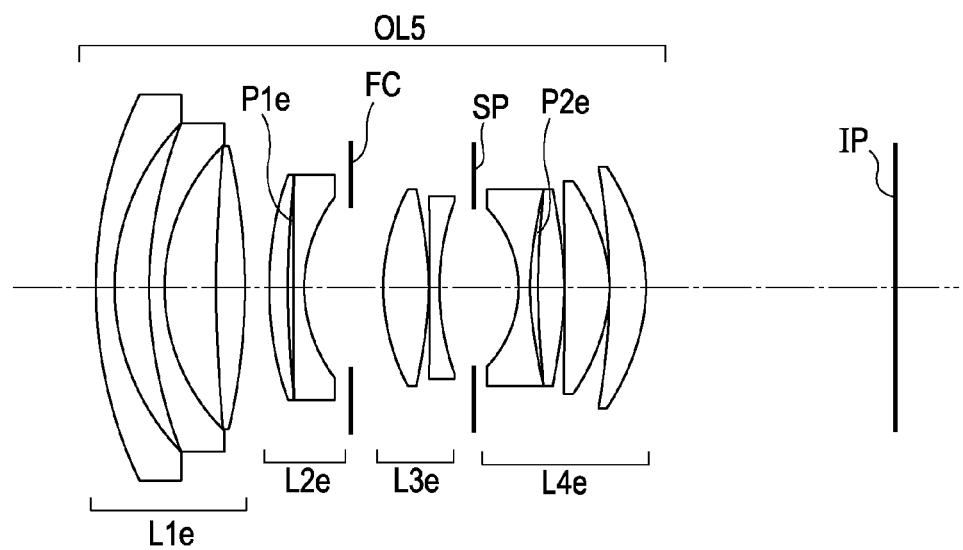
FIG. 9 is a cross-sectional view of an optical system according to a fifth exemplary embodiment of the present invention.

A fifth exemplary embodiment shown in FIG. 9 discloses an image-taking lens of an inverted telephoto (retrofocus) type. Herein, the image-taking lens of the inverted telephoto type is a lens system (e.g., including lens units L1e, L2e, L3e, and L4e) having a lens length longer than the focal length.

A lens P1e in the drawing can include a curable material, for example a UV curable resin (Nd=1.635, υd=22.7, θgF=0.69). That is, the lens P1e corresponds to the first refractive optical element according to fifth exemplary embodiment of the present invention.

A lens P2e can include a curable material, for example a UV curable acrylic polymer containing ITO particulates in a mixture ratio of 15% (Nd=1.579, υd=16.5, θgF=0.362), the acrylic polymer being used as materials for replica aspheric lenses. That is, the lens P2e corresponds to the second refractive optical element according to the fifth exemplary embodiment of the present invention.

Figure 11:
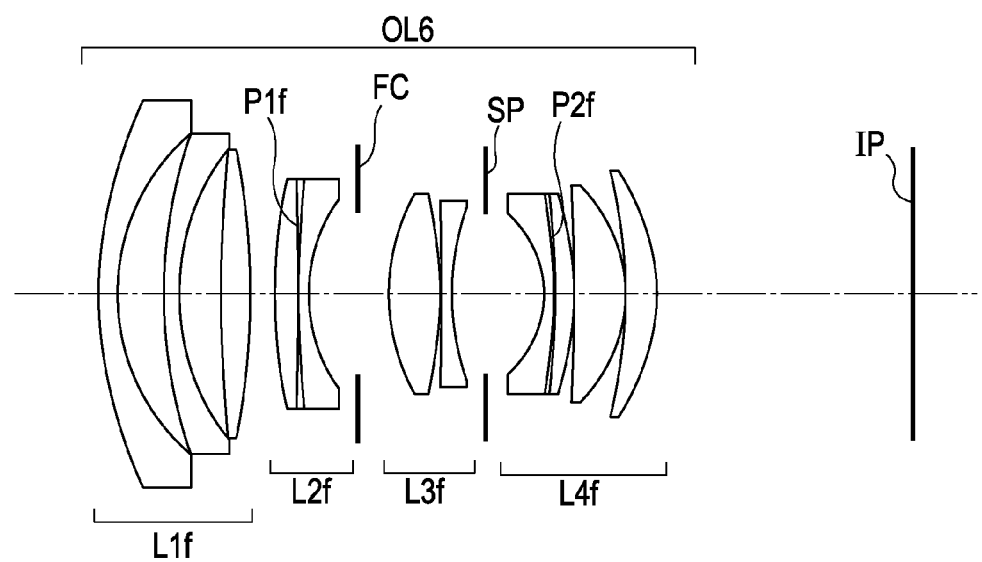
FIG. 11 is a cross-sectional view of an optical system according to a sixth exemplary embodiment of the present invention.

A sixth exemplary embodiment shown in FIG. 11 discloses an image-taking lens (e.g., including lens units L1f, L2f, L3f, and L4f) having a wide angle of view.

A lens P2f in the drawing can include curable material, for example a UV curable acrylic polymer containing ITO particulates in a mixture ratio of 15% (Nd=1.579, υd=16.5, θgF=0.362), the acrylic polymer being used as materials for replica aspheric lenses. That is, the lens P2f corresponds to the second refractive optical element according to the sixth exemplary embodiment of the present invention.

A lens P1f can also include curable material, for example a UV curable resin (Nd=1.635, υd=22.7, θgF=0.69). That is, the lens P1f corresponds to the first refractive optical element according to the sixth exemplary embodiment of the present invention.

Numerical Examples 1 to 6 correspond to the first to sixth exemplary embodiments, respectively, and will be described below. In the numerical examples, i, Ri, Di, Ni, and Vi, indicate the ordinal position of the surfaces from the object side, the ith curvature radius (of the ith surface), the gap between the ith surface and the (i+1)th surface, the refractive index with respect to the d line, and the Abbe number with respect to the d line, respectively.

The displacement X in the optical-axis direction at a height h from the optical axis with respect to the vertex of the plane of the aspherical surface can be expressed by Expression 1.

Expression 1:

$$X = \frac{(1/R)h^3}{1+\sqrt{(1-(1+k)(h/R)^2)}} - Ah^2 + Bh^4 + Ch^6 + Dh^8 + Eh^{10} + Fh^{12}$$

where R and k indicate a paraxial curvature radius and a conic constant, respectively; and A, B, C, D, E, and F are aspherical coefficients.

Notation "e-X" refers to "×10$^{-x}$". f, Fno, and ω indicate the focal length, the F-number, and the half-angle of view, respectively. Relationships between the above-described conditional expressions and the numerical values in the numerical examples are shown in Table 1.

Numerical Example 1 f=28.90~193.15 Fno=3.63~5.88 2ω=73.6~12.8

R 1=102.694 D1=1.50 N1=1.846660 υ1=23.9

R 2=67.525 D 2=0.05 N 2=1.578566 υ2=16.5

R 3=57.448 D 3=9.29 N 3=1.603112 υ3=60.6

R 4=−938.598 D 4=0.12

R 5=48.476 D 5=4.44 N 4=1.622992 υ4=58.2

R 6=82.382 D 6=variable

* R 7=73.541 D 7=1.20 N 5=1.834807 υ5=42.7

R 8=13.885 D 8=5.65

R 9=−33.988 D 9=0.60 N 6=1.578566 υ6=16.5

R10=−24.239 D10=1.00 N 7=1.834807 υυ7=42.7

R11=52.693 D11=0.12

R12=30.334 D12=4.52 N 8=1.755199 υ8=27.5

R13=−21.950 D13=0.60

R14=−17.654 D14=0.90 N 9=1.772499 υ9=49.6

R15=−69.021 D15=variable

R16=SP D16=0.94

R17=43.224 D17=4.08 N10=1.487490 υ10=70.2

R18=−30.236 D18=0.15

R19=26.744 D19=8.13 N11=1.487490 υ11=70.2 R20=−21.083 D20=0.90 N12=1.805181 υ12=25.4

R21=−63.759 D21=variable

R22=−51.876 D22=4.69 N13=1.740769 υ13=27.8

R23=−14.998 D23=0.90 N14=1.882997 υ14=40.8

R24=123.097 D24=variable

R25=85.239 D25=5.21 N15=1.583126 υ15=59.4

* R26=−20.371 D26=8.80

R27=−15.933 D27=1.50 N16=1.698947 υ16=30.1

R28=−16.645 D28=1.01 N17=1.635550 υ17=22.7

R29=−14.231 D29=1.50 N18=1.805181 υ18=25.4

R30=−24.910

\Focal length 28.90 80.81 193.15

Variable gap\

D 6 2.38 29.66 48.63

D15 19.64 8.93 1.39

D21 1.13 6.32 8.17

D24 7.85 2.66 0.81

Aspherical Coefficient

7th surface: A=0.00000e+00 B=3.02479e−06 C=1.16978e−08 D=−1.03310e−10 E=5.98212e−13 F=0.00000e+00

26th surface: A=0.00000e+00 B=5.57442e−06 C=2.59073e−08 D=−2.75874e−10 E=1.02062e−12 F=0.00000e+00

Numerical Example 2 f=28.90~193.17 Fno=3.63~5.88 2ω=73.6~12.8

R 1=132.527 D 1=1.50 N 1=1.846660 υ1=23.9

R 2=49.733 D 2=2.52 N 2=1.635550 υ2=22.7

R 3=67.379 D 3=7.08 N 3=1.622992 υ3=58.2

R 4=984.359 D 4=0.12

R 5=51.358 D 5=7.04 N 4=1.622992 υ4=58.2

R 6=234.151 D 6=variable

* R 7=73.837 D 7=1.20 N 5=1.834807 υ5=42.7

R 8=14.793 D 8=5.59

R 9=−44.796 D 9=0.21 N 6=1.578566 υ6=16.5

R10=−37.512 D10=1.00 N 7=1.834807 υ7=42.7

R11=45.257 D11=0.12

R12=27.772 D12=4.32 N 8=1.755199 υ8 27.5

R13=−30.460 D13=1.02

R14=−19.218 D14=0.90 N 9=1.772499 υ9=49.6

R15=101.774 D15=2.03 N10=1.784723 υ10=25.7

R16=−93.904 D16=variable

R17=SP D17=0.70

R18=34.666 D18=4.41 N11=1.518229 υ11=58.9

R19=−28.082 D19=0.15

R20=37.367 D20=4.95 N12=1.517417 υ12=52.4

R21=−20.919 D21=0.30 N 13=1.635550 υ13=22.7

R22=−18.412 D22=0.90 N14=1.846660 υ14=23.9

R23=−118.206 D23=variable

R24=−39.813 D24=2.43 N15=1.728250 υ15=28.5

R25=−18.948 D25=0.90 N16=1.882997 υ16=40.8

R26=−97.865 D26=variable

R27=52.675 D27=6.09 N17=1.583126 υ17=59.4

* R28=−20.674 D28=1.27

R29=315.706 D29=2.16 N18=1.487490 υ18=70.2

R30=−126.226 D30=3.07

R31=−21.208 D31=1.00 N19=1.834000 υ19=37.2

R32=284.744 D32=0.66 N20=1.635550 υ20=22.7

R33=−127.140 D33=1.00 N21=1.487490 υ21=70.2

R34=−1536.395

\Focal length 28.90 80.32 193.17

Variable gap\

D 6 2.42 29.11 48.39

D16 19.53 9.12 1.56

D23 1.76 10.01 13.38

D26 12.22 3.97 0.60

Aspherical Coefficient

7th surface: A=0.00000e+00 B=2.67286e-06 C=1.84979e-08 D=-1.56477e-10 E=6.99280e-13 F=0.00000e+00

28th surface: A=0.00000e+00 B=1.77385e-05 C=2.96988e-08 D=-1.06404e-10 E=3.66833e-13 F=0.00000e+00

Numerical Example 3 f=24.70~67.92 Fno=2.90~2.90 2ω=82.4~35.3

\* R1=164.900 D1=2.50 N1=1.772499 υ1=49.6

R 2=32.229 D 2=12.62

R 3=-187.833 D 3=2.30 N 2=1.772499 υ2=49.6

R 4=77.226 D 4=0.15

R 5=58.470 D 5=5.16 N 3=1.805181 υ3=25.4

R 6=259.048 D 6=0.05 N 4=1.635550 υ4=22.7

R 7=116.957 D 7=variable

R 8=117.293 D 8=1.90 N 5=1.846660 υ5=23.8

R 9=42.078 D 9=0.34 N 6=1.635550 υ6=22.7

R10=46.333 D10=6.98 N 7=1.696797 υ7=55.5

R11=-197.890 D11=0.15

R12=88.758 D12=4.09 N 8=1.834807 υ8=42.7

R13=-247.127 D13=0.15

R14=45.684 D14=4.82 N 9=1.696797 υ9=55.5

R15=387.307 D15=variable

R16=FS D16=2.10

R17=-154.972 D17=1.30 N 10=1.882997 υ10=40.8

R18=44.398 D18=2.50

R19=-103.592 D19=1.61 N10=1.772499 υ10=49.6

R20=28.669 D20=4.45 N11=1.805181υ11=25.4

R21=-214.785 D21=1.03

R22=SP D22=variable

R23=130.641 D23=1.30 N12=1.846660 υ12=23.9

R24=27.680 D24=0.05 N13=1.578566 υ13=16.5

R25=25.754 D25=7.33 N14=1.516330 υ14=64.1

R26=-40.387 D26=0.15

R27=32.774 D27=4.68 N15=1.620411 υ15=60.3

R28=-124.828 D28=variable

R29=-97.100 D29=2.82 N16=1.882997 υ16=40.8

R30=-41.123 D30=0.15

R31=-45.224 D31=1.20 N17=1.772499 υ17=49.6

R32=29.258 D32=variable

R33=78.519 D33=7.61 N18=1.583126 υ18=59.4

\* R34=-76.846

\Focal length 24.70 35.30 67.92

Variable gap\

D 7 54.09 28.54 1.50

D15 2.98 5.70 17.79

D22 16.60 13.88 1.79

D28 1.19 3.67 9.10

D32 4.24 11.69 15.90

Aspherical Coefficient

1st surface: A=0.00000e+00 B=1.18117e-06 C=1.06699e-09 D=-3.06461e-12 E=3.17212e-15 F=-1.19658e-18

34th surface: A=-0.00000e+00 B=8.11421e-07 C=-2.03354e-08 D=1.22131e-10 E=-3.54783e-13 F=3.93194e-16

Numerical Example 4 f=16.49~33.98 Fno=2.90~2.90 2ω=105.4~65.0

\* R1=802.400 D1=2.00 N1=1.772499 υ1=49.6

R 2=21.308 D 2=0.32 N 2=1.578566 υ2=16.5

R 3=21.638 D 3=16.86

R 4=-63.782 D 4=1.20 N 3=1.834807 υ3=42.7

R 5=44.159 D 5=0.34 N 4=1.524200 υ4=51.4

\* R 6=63.976 D 6=0.15

R 7=39.553 D 7=4.34 N 5=1.805181 υ5=25.4

R 8=1131.513 D 8=variable

R 9=41.991 D 9=1.30 N 6=1.805181 υ6=25.4

R10=20.820 D10=0.54 N 7=1.635550 υ7=22.7

R11=23.803 D11=8.30 N 8=1.517417 υ8=52.4

R12=-107.329 D12=0.15

R13=40.735 D13=4.22 N 9=1.696797 υ9=55.5

R14=-102.029 D14=variable

R15=SP D15=1.56

R16=-1875.433 D16=1.52 N10=1.882997 υ10=40.8

R17=56.883 D17=3.14

R18=-31.008 D18=1.00 N11=1.617722 υ11=49.8

R19=29.627 D19=5.44 N12=1.805181 υ12=25.4

R20=-108.394 D20=1.02

R21=FS D21=variable

R22=32.026 D22=7.49 N13=1.496999 υ13=81.5

R23=-26.456 D23=0.05 N14=1.578566 υ14=16.5

R24=-28.882 D24=1.30 N15=1.846660 υ15=23.9

R25=-44.405 D25=0.20

R26=-251.883 D26=1.20 N16=1.846660 υ16=23.9

R27=26.924 D27=2.31 N17=1.635550 υ17=22.7

R28=71.847 D28=4.55 N18=1.496999 υ18=81.5

R29=-68.447 D29=0.15

R30=264.450 D30=3.00 N19=1.730770 υ19=40.5

* R31=−132.564 D31=variable

R32=FC

\Focal length 16.49 24.00 33.98

Variable Gap\

D 8 21.43 8.55 1.13

D14 0.85 5.68 11.12

D21 10.28 5.45 0.01

D31 0.00 8.55 20.30

Aspherical Coefficient

1st surface: A=0.00000e+00 B=1.62651e−05 C=−2.41951e−08 D=3.40722e−11 E=−2.82586e−14 F=1.10415e−17

6th surface: A=0.00000e+00 B=1.41432e−05 C=6.38426e−09 D=−2.43697e−10 E=1.14082e−12 F=−1.78942e−15

31st surface: A=0.00000e+00 B=9.83727e−06 C=8.54996e−09 D=6.55809e−11 E=−3.22925e−13 F=6.78586e−16

Numerical Example 5 f=24.60 Fno=1.46 2ω0=82.7

R1=65.313 D1=2.80 N1=1.696797 υ1=55.5

R 2=31.601 D 2=6.86

R 3=76.307 D 3=2.30 N 2=1.696797 υ2=55.5

R 4=35.016 D 4=6.48

R 5=322.917 D 5=4.38 N 3=1.834000 υ3=37.2

R 6=−101.191 D 6=3.64

R 7=78.925 D 7=3.46 N 4=1.846660 υ4=23.8

R 8=−527.679 D 8=0.05 N 5=1.635550 υ5=22.7

R 9=173.236 D 9=1.65 N 6=1.487490 υ6=70.2

R10=23.776 D10=7.10

R11=FC D11=4.98

R12=30.832 D12=7.82 N 7=1.804000 υ7=46.6

R13=−59.395 D13=0.15

R14=−353.576 D14=1.48 N 8=1.755199 υ8=27.5

R15=40.441 D15=5.13

R16=SP D16=8.68

R17=−16.042 D17=1.50 N 9=1.805181 υ9=25.4

R18=−76.756 D18=0.05 N10=1.578566 υ10=16.5

R19=−146.535 D19=2.98 N11=1.834807 υ11=42.7

* R20=−32.582 D20=0.15

R21=−193.002 D21=7.37 N12=1.603112 υ12=60.7

R22=−22.620 D22=0.15

R23=−69.417 D23=4.85 N13=1.772499 υ13=49.6

R24=−30.218 D24=36.47

Aspherical Coefficient

20th surface: A=0.00000e+00 B=2.13762e−05 C=2.72007e−08 D=−1.80717e−11 E=−1.75506e−13

Numerical Example 6 f=24.83 Fno=1.46 2ω=82.1

R1=67.697 D1=2.80 N1=1.696797 υ1=55.5

R 2=35.617 D 2=5.28

R 3=68.261 D 3=2.30 N 2=1.696797 υ2=55.5

R 4=30.886 D 4=7.72

R 5=286.375 D 5=4.38 N 3=1.712995 υ3=53.8

R 6=−90.506 D 6=3.68

R 7=60.777 D 7=2.81 N 4=1.755199 υ4=27.5

R 8=177.484 D 8=0.70 N 5=1.635550 υ5=22.7

R 9=2235.655 D 9=1.70 N 6=1.487490 υ6=70.2

R10=22.928 D10=7.10

R11=∞ D11=4.87

R12=30.895 D12=6.78 N 7=1.804000 υ7=46.6

R13=−59.022 D13=0.15

R14=−2922.376 D14=1.48 N 8=1.728250 υ8=28.5

R15=39.587 D15=5.13

R16=SP D16=6.89

R17=−17.193 D17=1.50 N 9=1.805181 υ9=25.4

R18=48.968 D18=1.22 N 5=1.578566 υ5=16.5

R19=124.262 D19=4.00 N11=1.834807 υ11=42.7

* R20=−40.549 D20=0.15

R21=−422.369 D21=6.62 N12=1.603112 υ12=60.7

R22=−25.797 D22=0.15

R23=−87.810 D23=5.41 N13=1.772499 υ13=49.6

R24=−29.834 D24=36.47

Aspherical Coefficient

20th surface: A=0.00000e+00 B=1.76037e−05 C=1.33192e−08 D=−2.62982e−12 E=−1.42186e−13

TABLE 1

| Example | | Left-hand side of conditional expression (1) | $\theta_g F$ | Left-hand side of conditional expression (2) |
|---|---|---|---|---|
| 1 | First refractive optical element | 0.64 | 0.69 | — |
|   | Second refractive optical element | — | 0.36 | 0.59 |
| 2 | First refractive optical element | 0.64 | 0.69 | — |
|   | Second refractive optical element | — | 0.36 | 0.59 |
| 3 | First refractive optical element | 0.64 | 0.69 | — |
|   | Second refractive optical element | — | 0.36 | 0.59 |
| 4 | First refractive optical element | 0.64 | 0.69 | — |
|   | Second refractive optical element | — | 0.36 | 0.59 |
| 5 | First refractive optical element | 0.64 | 0.69 | — |
|   | Second refractive optical element | — | 0.36 | 0.59 |

TABLE 1-continued

| Example | | Left-hand side of conditional expression (1) | $\theta_g F$ | Left-hand side of conditional expression (2) |
|---|---|---|---|---|
| 6 | First refractive optical element | 0.64 | 0.69 | — |
| | Second refractive optical element | — | 0.36 | 0.59 |

Next, an exemplary embodiment of a single-lens reflex (SLR) camera system including the optical system according to at least one exemplary embodiment of the present invention serving as an image-taking lens will be described with reference to FIG. 13.

Figure 13:
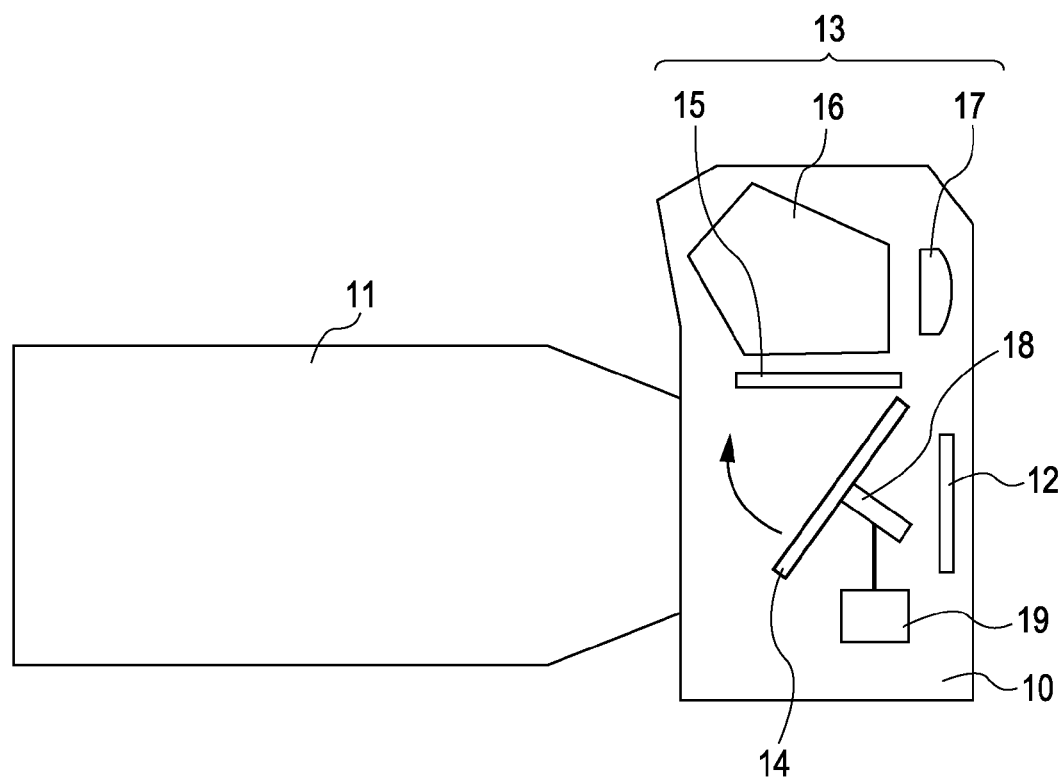
FIG. 13 is a schematic view of an imaging apparatus according to an exemplary embodiment of the present invention.

The SLR camera system shown in FIG. 13 includes a body 10, an interchangeable lens 11 including the optical system according to the present invention, and a photosurface 12 of a film, an image-pickup device, or the like that records object images obtained through the interchangeable lens 11.

The SLR camera system further includes a finder optical system 13 through which a photographer can view the object images obtained through the interchangeable lens 11, and a rotatable quick-return mirror 14 that transmits the object images obtained through the interchangeable lens 11 to the photosurface 12 or the finder optical system 13.

When the photographer views the object images through the finder, the object images formed on a focusing plate 15 via the quick-return mirror 14 are converted into erect images using a pentaprism 16, and then enlarged by an ocular optical system 17.

During capturing of images, the quick-return mirror 14 is rotated in the direction of an arrow such that the object images are formed on the photosurface 12. Herein, reference numerals 18 and 19 denote a sub-mirror and a focus detector, respectively.

The imaging optical system according to at least one exemplary embodiment of the present invention applied to imaging devices such as interchangeable lenses for SLR cameras in this manner can achieve high optical performance.

Exemplary embodiments of the present invention are also applicable to SLR cameras without quick-return mirrors.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Patent Application No. 2005-361953 filed Dec. 15, 2005, which is hereby incorporated by reference herein in its entirety.

What is claimed is:

1. An optical system comprising:
    at least one first refractive optical element which includes a solid material satisfying the following conditional expression (1); and
    at least one second refractive optical element which includes a solid material satisfying the following conditional expression (2):

$$-1.33 \times 10^{-3} \times \upsilon d + 6.7 \times 10^{-1} < \theta g F \quad (1)$$

$$-1.63 \times 10^{-3} \times \upsilon d + 6.2 \times 10^{-1} > \theta g F \quad (2)$$

where $\upsilon d$ and $\theta g F$ indicate the Abbe number and the partial dispersion ratio, respectively.

2. The optical system according to claim 1, further comprising:
    a first lens unit having a positive refractive power;
    a second lens unit having a negative refractive power;
    a third lens unit having a positive refractive power;
    a fourth lens unit having a negative refractive power; and
    a fifth lens unit having a positive refractive power, the lens units being aligned in this order from a position adjacent to an object to a position adjacent to an image-taking side, wherein
    gaps between each two adjacent lens units are changed during zooming such that the gap between the first and second lens units is increased, the gap between the second and third lens units is reduced, the gap between the third and fourth lens units is increased, and the gap between the fourth and fifth lens units is reduced at the telephoto end compared with those at the wide-angle end.

3. The optical system according to claim 2, wherein the first, second, and fifth lens units each include at least one of the first and second refractive optical elements.

4. The optical system according to claim 1, further comprising:
    a first lens unit having a negative refractive power;
    a second lens unit having a positive refractive power;
    a third lens unit having a negative refractive power; and
    a fourth lens unit having a positive refractive power, the lens units being aligned in this order from a position adjacent to an object to a position adjacent to an image-taking side, wherein
    gaps between each two adjacent lens units are changed during zooming such that the gap between the first and second lens units is reduced, the gap between the second and third lens units is increased, and the gap between the third and fourth lens units is reduced at the telephoto end compared with those at the wide-angle end.

5. The optical system according to claim 4, wherein the first, second, and fourth lens units each include at least one of the first and second refractive optical elements.

6. The optical system according to claim 1, wherein an image is formed on a photoelectric transducer.

7. An optical apparatus comprising:
    the optical system according to claim 1; and
    an imaging device, wherein the optical system forms an image in the imaging device.

8. The optical apparatus according to claim 7, wherein the imaging device is a camera.

* * * * *

UNITED STATES PATENT AND TRADEMARK OFFICE
CERTIFICATE OF CORRECTION

PATENT NO. : 7,292,398 B1  Page 1 of 1
APPLICATION NO. : 11/552542
DATED : November 6, 2007
INVENTOR(S) : Makoto Misaka It is certified that error appears in the above-identified patent and that said Letters Patent is hereby corrected as shown below:

On the Title Page, please insert

Item (65)          Prior Publication Data
    US 2007/0139794 A1  Jun. 21, 2007

Signed and Sealed this

Tenth Day of June, 2008

JON W. DUDAS
*Director of the United States Patent and Trademark Office*